United States Patent [19]
Kaneko

[11] Patent Number: 5,983,199
[45] Date of Patent: Nov. 9, 1999

[54] ON-LINE SHOPPING SYSTEM

[75] Inventor: Toshiyuki Kaneko, Kawasaki, Japan

[73] Assignee: Fujitsu Limited, Kanagawa, Japan

[21] Appl. No.: 08/885,685

[22] Filed: Jun. 30, 1997

[30] Foreign Application Priority Data

Jan. 8, 1997 [JP] Japan .................................... 9-001066

[51] Int. Cl.⁶ .............................. G06F 15/16; G06F 15/82
[52] U.S. Cl. ........................ 705/26; 705/14; 395/200.47; 395/200.48; 395/200.33
[58] Field of Search .................. 705/26, 14; 395/200.47, 395/200.48, 200.33

[56] References Cited

U.S. PATENT DOCUMENTS

| | | | |
|---|---|---|---|
| 5,710,887 | 1/1998 | Chelliah et al. | 705/26 |
| 5,717,860 | 2/1998 | Graber et al. | 395/200.12 |
| 5,734,828 | 3/1998 | Pendse et al. | 395/200.33 |
| 5,745,556 | 4/1998 | Ronen | 379/127 |
| 5,787,253 | 7/1998 | McCreery et al. | 395/200.61 |
| 5,794,210 | 8/1998 | Goldhaber et al. | 705/14 |
| 5,799,285 | 8/1998 | Klingman | 705/26 |
| 5,812,776 | 9/1998 | Gifford | 395/200.47 |

FOREIGN PATENT DOCUMENTS

| | | |
|---|---|---|
| 5-356794 | 5/1995 | Japan . |
| 8-237244 | 9/1996 | Japan . |

*Primary Examiner*—Allen R. MacDonald
*Assistant Examiner*—Penny Cauclle
*Attorney, Agent, or Firm*—Helfgott & Karas, PC.

[57] ABSTRACT

An on-line shopping system is provided which enables users to do shopping by referring to on-line advertisements posted on home pages. A WWW server and an exchange are connected in one-to-one correspondence. The exchange finally receives a PPP dial-up from a user device and thus can be informed of the originating number of the user device. First information about the connection of the user device to the WWW server is stored in storage unit after the transmitting port number accompanying the first information is converted to a corresponding line number. Also, second information (originating number) about the connection of the user device, obtained at the exchange, is stored in the storage unit together with a line number. In the storage unit, the first information and the second information are combined through the agency of the line number.

18 Claims, 15 Drawing Sheets

| PORT NO. | LINE NO. |
|---|---|
| 1 | 2000 |
| 2 | 2010 |
| 3 | 2020 |

FIG. 3

| No. | LINE NO. | ORIGINATING NO. | HOME PAGE NAME | CONNECTION START TIME | CONNECTION END TIME | HOME PAGE ACCESS START TIME | PURCHASE | CALL-BACK |
|---|---|---|---|---|---|---|---|---|
| 1 | 2000 | 044-777-1111 | | | | | | |
| 2 | 2000 | 044-777-1111 | | 9/6 FRI 15:00 | | | | |
| 3 | 2000 | | Fujitsu.html | | | 9/6 FRI 15:00 | NOT DESIRED | NOT REQUIRED |
| 4 | 2000 | | FMV.html | | | 9/6 FRI 15:50 | DESIRED | REQUIRED |
| 5 | 2000 | 044-777-1111 | | | 9/6 FRI 15:10 | | | |

FIG. 4

| HOME PAGE NAME | OPERATOR'S NO. | IP ADDRESS |
|---|---|---|
| Fujtsu.html | 5010 | 111.222.333.444 |
| FMV.html | 5000 | 111.222.333.445 |

| NO. | ORIGINATING NO. | HOME PAGE ACCESS TIME |
|---|---|---|
| 1 | 044-777-1111 | 300s |
| 2 | 044-777-1112 | 300s |

FIG. 7 (B)

| NO. | ORIGINATING NO. | HOME PAGE ACCESS TIME |
|---|---|---|
| 1 | 044-777-1111 | 500s |
| 2 | 044-777-1112 | 300s |

FIG. 7 (C)

| HOME PAGE ACCESS TIME |
|---|
| 500s |

FIG. 8 (A)

| NO. | ORIGINATING NO. | HOME PAGE ACCESS FREQUENCY |
|---|---|---|
| 1 | 044-777-1111 | 15 |
| 2 | 044-777-1112 | 3 |

FIG. 8 (B)

| HOME PAGE ACCESS FREQUENCY |
|---|
| 5 |

FIG. 9 (A)

| NO. | ORIGINATING NO. | HOME PAGE ACCESS TIME | DATE OF ACCESS |
|---|---|---|---|
| 1 | 044-777-1111 | 300s | 96/9/6 |
| 2 | 044-777-1112 | 200s | 96/9/6 |

FIG. 9 (B)

| NO. | ORIGINATING NO. | HOME PAGE ACCESS TIME |
|---|---|---|
| 1 | 044-777-1111 | 500s |
| 2 | 044-777-1112 | 300s |

FIG. 9 (C)

| HOME PAGE ACCESS TIME |
|---|
| 500s |

FIG. 10 (A)

| NO. | ORIGINATING NO. | HOME PAGE ACCESS FREQUENCY |
|---|---|---|
| 1 | 044-777-1111 | 15 |
| 2 | 044-777-1112 | 3 |

FIG. 10 (B)

| HOME PAGE ACCESS FREQUENCY |
|---|
| 10 |

FIG. 11 (A)

| NO. | ORIGINATING NO. | HOME PAGE NAME | HOME PAGE ACCESS TIME | DATE OF ACCESS |
|---|---|---|---|---|
| 1 | 044-777-1111 | Fujitsu.html | 300s | 96/9/6 |
| 2 | 044-777-1111 | FMV.html | 300s | 96/9/6 |

FIG. 11 (B)

| NO. | ORIGINATING NO. | HOME PAGE NAME | HOME PAGE ACCESS TIME |
|---|---|---|---|
| 1 | 044-777-1111 | Fujitsu.html | 500s |
| 2 | 044-777-1111 | FMV.html | 300s |

| NO. | ORIGINATING NO. | HOME PAGE NAME | HOME PAGE ACCESS FREQUENCY |
|---|---|---|---|
| 1 | 044-777-1111 | Fujitsu.html | 15 |
| 2 | 044-777-1111 | FMV.html | 3 |

FIG. 12

| CUSTOMER NAME | ADDRESS | PHONE | AGE | OCCU-PATION | DELINQUENCY IN PAYMENT | SUM TOTAL OF PAST PURCHASE |
|---|---|---|---|---|---|---|
| MICHIO FUJI | OTA-KU.... | 03-4444-5555 | 40 | SELF-EMPLOYED | YES | 10,000 |
| MICHIKO FUJI | YOKOHAMA-SHI...... | 045-666-7777 | 60 | NONE | NO | 50,000 |
| MICHINOBU FUJI | KAWASAKI-SHI.... | 044-777-1111 | 30 | OFFICE WORKER | NO | 30,000 |

FIG. 13

| NO. | ORIGINATING NO. | DAY AND TIME OF ACCESS |
|---|---|---|
| 1 | 044-777-1111 | FRI 20:00 |
| 2 | 044-777-1112 | WED 15:00 |

FIG. 14

| NO. | ORIGINATING NO. |
|---|---|
| 1 | 044-777-1111 |
| 2 | 044-777-1112 |

FIG. 15

ON-LINE SHOPPING SYSTEM

BACKGROUND OF THE INVENTION

1. Field of the Invention

The present invention relates to an on-line shopping system, and more particularly, to an on-line shopping system which enables users to do shopping by referring to on-line advertisements posted on home pages provided by World Wide Web (WWW) servers on the Internet.

2. Description of the Related Art

With recent popularization of the Internet, so-called on-line shopping has become available wherein catalogs are posted on home pages provided by WWW servers on the Internet so that users can access home pages and purchase goods or services on-line.

In the field of such on-line shopping, there is a demand for a service that allows traders to automatically make a telephone call to users after the termination of access to home pages, for the purpose of confirming the purchase or persuading users to purchase, etc.

Conventionally, to enable a trader who has an advertisement posted on a home page to contact a user by telephone after the user accesses the home page, a menu for the entry of users' contact telephone numbers is provided on the home page so that users can enter their telephone number on the menu.

However, the conventional method cannot deal with the following cases:

(1) User enters an erroneous telephone number by mistake.
(2) User does not enter his or her telephone number.
(3) User cannot reach the home page because of line busy condition or the like.

In such cases, the trader loses the business chance. Also, users cannot obtain desired information or place an order for goods etc.

SUMMARY OF THE INVENTION

An object of the present invention is to provide an on-line shopping system which enables a WWW server to acquire users' telephone numbers without the need to have users enter their telephone number and thus can provide novel services.

To achieve the above object, there is provided an on-line shopping system which enables users to do shopping by referring to on-line advertisements posted on home pages provided by WWW servers on Internet. This on-line shopping system comprises a WWW server having a plurality of transmitting ports and providing at least one home page via each of the transmitting ports, an exchange connected in one-to-one correspondence to the WWW server and finally receiving a Point-to-Point Protocol (PPP) dial-up from a user device, a conversion table for converting numbers assigned to the respective transmitting ports of the WWW server to corresponding line numbers of line concentrators of the exchange connected to the respective transmitting ports, number converting means for converting a transmitting port number, which accompanies first information about connection of the user device to the WWW server, to a corresponding line number by referring to the conversion table, and storage means for storing the first information accompanied by the line number obtained by the number converting means, and for storing second information about connection of the user device, obtained at the exchange, together with a line number accompanying the second information.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing an example of a port number-to-line number conversion table;

FIG. 4 is a diagram showing an example of a user access logging table;

FIG. 5 is a diagram showing an example of operator information;

FIG. 7(A) is a diagram showing, by way of example, access times calculated based on access histories according to a second embodiment;

FIG. 7(B) is a diagram showing the result of accumulation of access times of individual users;

FIG. 7(C) is a diagram showing a reference access time;

FIG. 8(A) is a diagram showing, by way of example, access frequencies calculated based on access histories according to a third embodiment;

FIG. 8(B) is a diagram showing a reference access frequency;

FIG. 9(A) is a diagram showing, by way of example, access times calculated based on access histories according to a fourth embodiment;

FIG. 9(B) is a diagram showing the result of accumulation of access times of individual users;

FIG. 9(C) is a diagram showing a reference access time;

FIG. 10(A) is a diagram showing, by way of example, access frequencies calculated based on access histories according to a fifth embodiment;

FIG. 10(B) is a diagram showing a reference access frequency;

FIG. 11(A) is a diagram showing, by way of example, access times of individual home pages, calculated based on an access history according to a sixth embodiment;

FIG. 11(B) is a diagram showing the result of accumulation of access times for which a user accessed individual home pages during a predetermined term;

FIG. 12 is a diagram showing, by way of example, access frequencies of individual home pages, calculated based on access histories according to a seventh embodiment;

FIG. 13 is a diagram showing an example of customer information according to an eighth embodiment;

FIG. 14 is a diagram illustrating a method of using access histories according to a ninth embodiment; and FIG. 15 is a diagram illustrating a method of using access histories according to a tenth embodiment.

DESCRIPTION OF THE PREFERRED EMBODIMENTS

Embodiments of the present invention will be hereinafter described with reference to the drawings.

Figure 1:
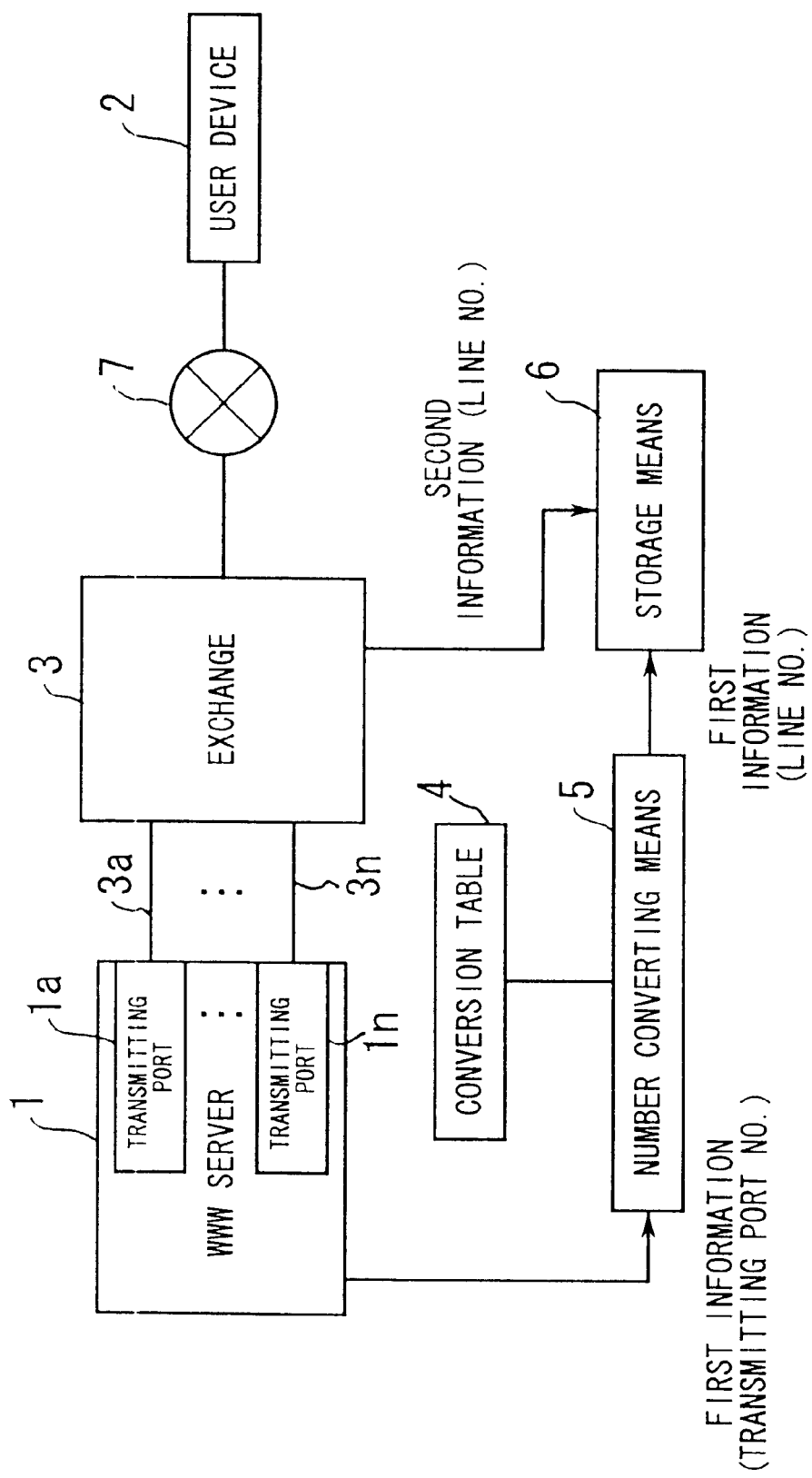
FIG. 1 is a diagram illustrating the principle of the present invention.

Referring first to FIG. 1, a theoretical configuration according to a first embodiment of the present invention will be explained. The first embodiment comprises a WWW server 1 having a plurality of transmitting ports and providing at least one home page via each of the transmitting ports, an exchange 3 connected in one-to-one correspondence to the WWW server 1 and finally receiving a PPP dial-up from a user device 2, a conversion table 4 for converting numbers assigned to the respective transmitting ports 1a to 1n of the WWW server 1 to corresponding line numbers of line concentrators 3a to 3n of the exchange 3 connected to the respective transmitting ports 1a to 1n, number converting means 5 for converting a transmitting port number, which accompanies first information about connection of the user device 2 to the WWW server 1, to a corresponding line number by referring to the conversion table 4, and storage means 6 for storing the first information accompanied by the line number obtained by the number converting means 5, and for storing second information about connection of the user device 2, obtained at the exchange 3, together with a line number accompanying the second information. The user device 2 and the exchange 3 are interconnected via a public network 7, and the exchange 3 is a Private Branch exchange (PBX).

In the configuration described above, one exchange 3 is associated with one WWW server 1, and the WWW server 1 has a plurality of transmitting ports 1a to 1n, to which are respectively connected the line concentrators 3a to 3n of the exchange 3. The WWW server 1 provides at least one home page via an identical transmitting port.

When the user device 2 is connected to the WWW server 1, first information is generated in the WWW server 1, which information indicates, for example, the date and time at which the user device 2 was connected to the WWW server 1, the date and time at which the connection was terminated, the dates and times at which the user device 2 accessed individual home pages provided by the WWW server 1, etc. This first information is in one-to-one correspondence to that transmitting port of the WWW server 1 which is located on the route connecting the user device 2 and the WWW server 1. Namely, the first information generated when the user device 2 is connected to the WWW server 1 via one transmitting port is different in content from the first information generated when the user device 2 is connected to the WWW server 1 via another transmitting port. In other words, it can be said that the transmitting port number is an attribute of the first information.

The number converting means 5 converts the transmitting port number accompanying the first information to a line number by using the conversion table 4. The first information accompanied by the line number is then stored in the storage means 6.

Meanwhile, when the user device 2 is connected to the WWW server 1, second information including the telephone number of the user device 2, for example, is obtained at the exchange 3. This is because an originating number notification service permits the exchange 3 to be notified of the telephone number of the user device 2 obtained at a central office trunk (COT; not shown). The second information is in one-to-one correspondence to that one of the line concentrators (LCs) 3a to 3n of the exchange 3 which is located on the route connecting the user device 2 and the WWW server 1. Namely, the second information generated when one user device is connected to the WWW server 1 via one line concentrator is different in content from the second information generated when another user device is connected to the WWW server 1 via another line concentrator. In other words, it can be said that the line number of each line concentrator is an attribute of the second information during one session of access.

The second information accompanied by the line number is also stored in the storage means 6.

Accordingly, in the storage means 6, the first information and the second information are combined through the agency of the line number. Consequently, after the access to a home page is terminated, it is possible to automatically connect the telephones of two parties, for example, a trader who has an advertisement posted on the home page and a user who accessed the home page, without the need to have the user enter his/her telephone number on the home page.

The first embodiment of the present invention will be now described in detail.

Figure 2:
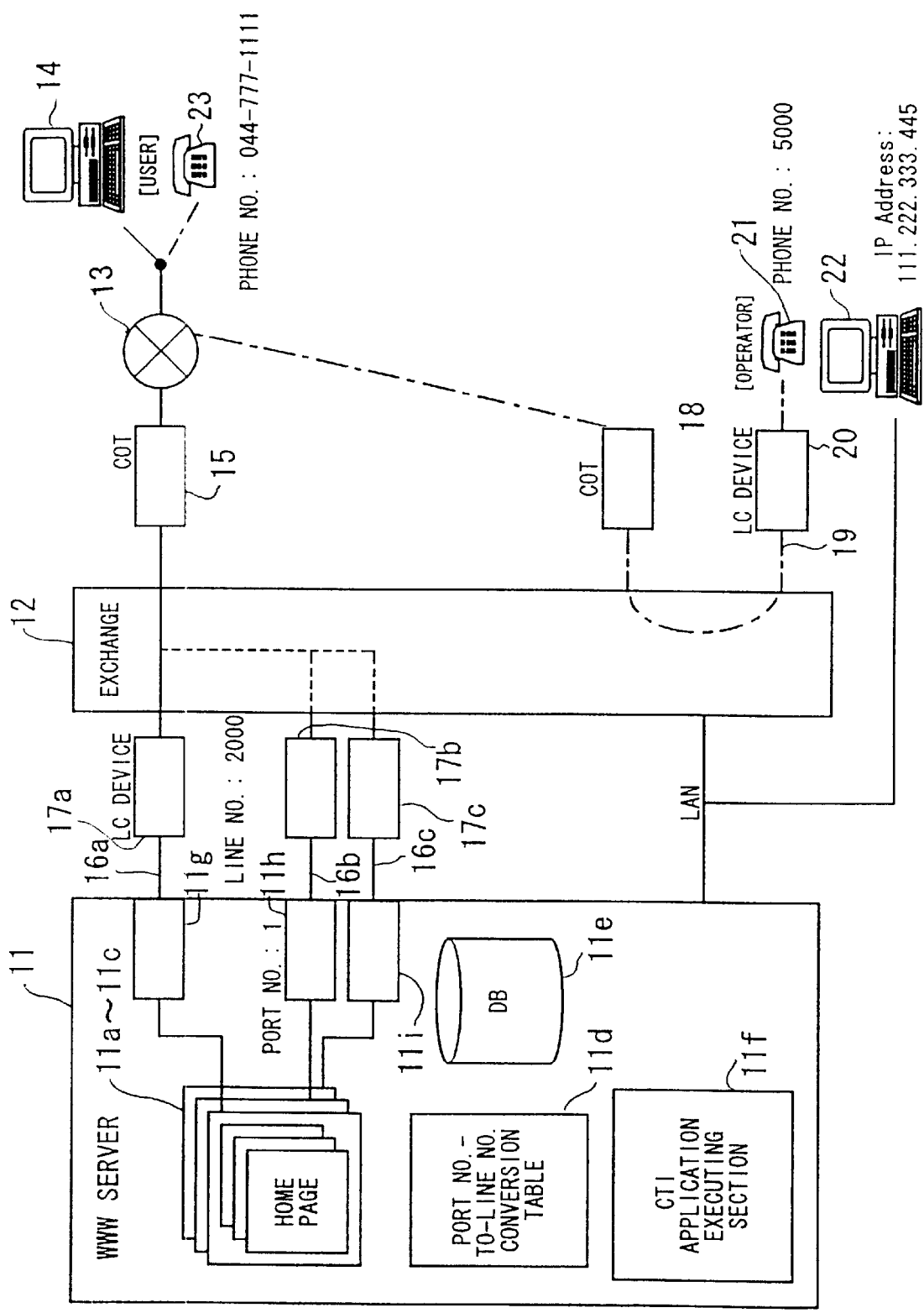
FIG. 2 is a block diagram showing in detail the configuration of an on-line shopping system according to a first embodiment.

FIG. 2 is a block diagram showing in detail the configuration of an on-line shopping system according to the first embodiment. As shown in FIG. 2, one exchange 12 is associated with one WWW server 11, and is connected via a public network 13 to a personal computer 14 as a user device. A central office trunk (COT) 15 stands between the exchange 12 and the public network 13. The exchange 12 and the WWW server 11 are connected by line concentrators (LCs) 16a to 16c, which are provided respectively with LC devices 17a to 17c. It is here assumed that the line numbers of the line concentrators 16a to 16c are, for example, 2000, 2010 and 2020, respectively. Another central office trunk (COT) 18 stands between the exchange 12 and the public network 13, and another line concentrator (LC) 19 provided with an LC device 20 is connected to the exchange 12. The exchange 12 is connected via the line concentrator 19 to an operator's telephone 21. The operator is a distributor of goods or services who has an on-line advertisement posted on a home page provided by the WWW server 11, or a person who explains or sells goods or services on consignment from such a distributor. The number of the telephone 21 is, for example, 5000. Operators may be stationed such that the WWW server 11, home page providing sections 11a to 11c mentioned later and, if necessary, the home pages themselves are each taken care of by one operator. The WWW server 11 and the exchange 12 are connected via a LAN, to a which is also connected the operator's personal computer 22. The personal computer 22 has an IP address of, for example, 111.222.333.445. The user has a telephone 23 connected to the public network 13. The number of the telephone 23 is, for example, 044-777-1111. Needless to say, there may be multiple users, though FIG. 2 illustrates only one user.

The WWW server 11 is provided with three home page providing sections 11a to 11c, a port number-to-line number conversion table 11d, a database 11e, a CTI application executing section 11f, and three transmitting ports 11g to 11i. The home page providing sections 11a to 11c are connected to the transmitting ports 11g to 11i, respectively, are each capable of providing a plurality of home pages, and output the home pages specified by users via the corresponding transmitting ports. The port numbers of the transmitting ports 11g to 11i are, for example, 1, 2 and 3, respectively.

Figure 3:
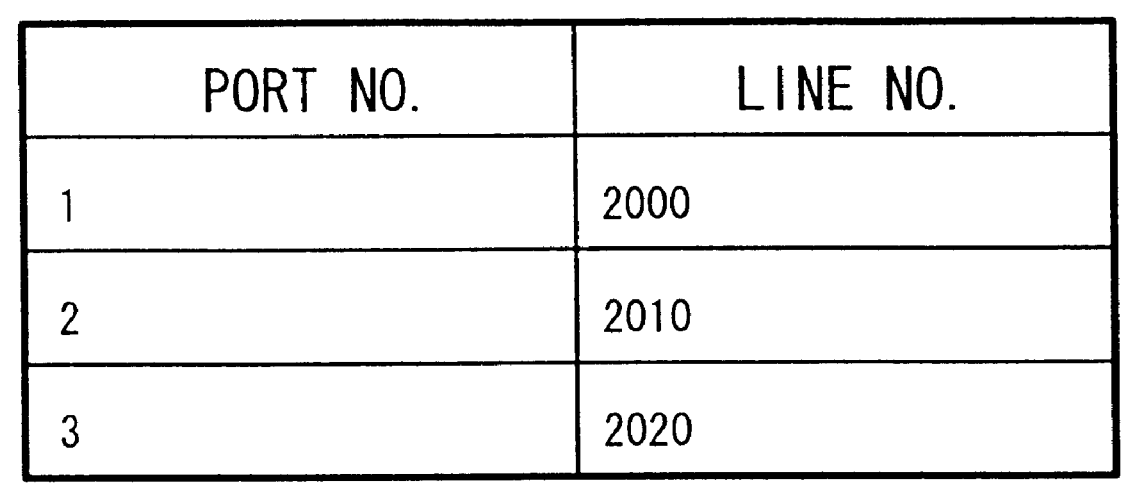

The port number-to-line number conversion table 11d is a table in which are described the correspondences of the individual port numbers of the transmitting ports 11g to 11i to the respective line numbers of the line concentrators 16a to 16c. FIG. 3 shows such a table whose contents are in agreement with the aforementioned settings. This port number-to-line number conversion table 11d is used when a port number is converted to a line number.

The database 11e is a shared storage device which is used for storing data generated by the WWW server 11 and also for storing data obtained at the exchange 12. The database 11e holds a user access logging table, as shown in FIG. 4, and operator information as shown in FIG. 5. In the user access logging table are recorded line number, originating number (calling party's number), home page name, connection start time, connection end time, home page access start time, whether or not the user desires to purchase, whether or not call-back is required, etc., as shown in FIG. 4. These data items are entered each time a line connection is established. As shown in FIG. 5, the operator information includes home page name, operator's telephone number, and operator's IP address, and these items of data are set beforehand. The function of the database 11e will be described later with reference to FIG. 6.

The CTI application executing section 11f performs processes which include writing data into the database 11e, requesting the exchange 12 to establish a connection between an operator's telephone and a user's telephone in accordance with the contents stored in the database 11e, etc. The CTI application executing section 11f executes a Computer Telephony Integration (CTI) application using Application Programming Interface (API) such as Telephony Services Application Programming Interface (TSAPI) for controlling an exchange in a personal computer LAN environment. In this example, Versit TSAPI is used as the API for interfacing the CTI application executing section 11f with the exchange 12. The operation of the CTI application executing section 11f will be explained in detail with reference to FIG. 6.

Figure 6:
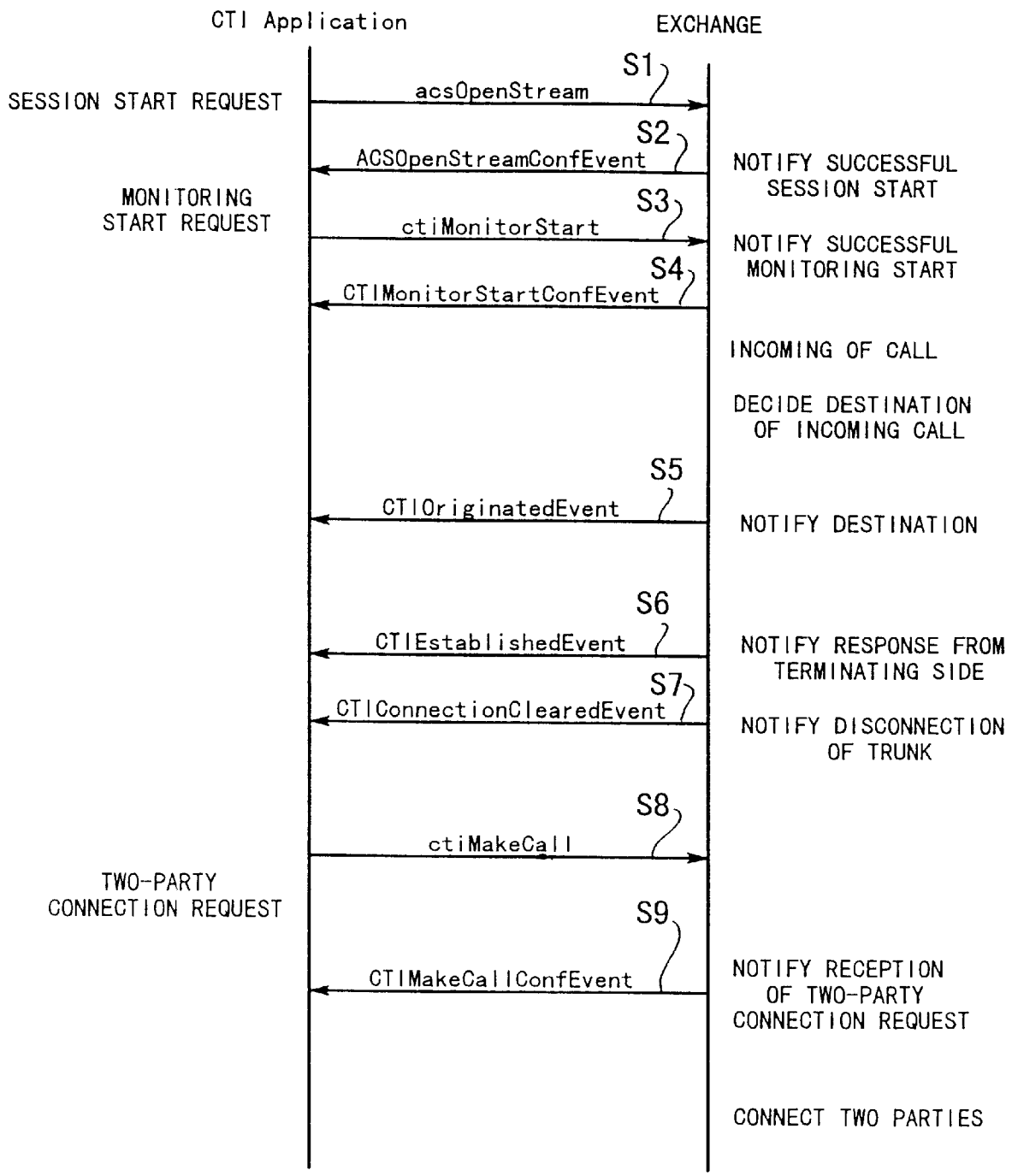
FIG. 6 is a sequence diagram showing the operation of a CTI application executing section and an exchange.

FIG. 6 is a sequence diagram showing the operation of the CTI application executing section 11f and the exchange 12. The following description is given in order of step numbers shown in FIG. 6.

[S1] The CTI application executing section 11f notifies the exchange 12 of acsOpenStream (defined by Versit TSAPI), which is a session start request, via the LAN.

[S2] The exchange 12 notifies the CTI application executing section 11f of ACSOpenStreamConfEvent (defined by Versit TSAPI), which indicates success in session start, via the LAN.

[S3] On receiving the ACSOpenStreamConfEvent, the CTI application executing section 11f sends citMonitorStart (defined by Versit TSAPI), which is a request to start monitoring the central office trunk 15, to the exchange 12 via the LAN.

[S4] The exchange 12 notifies the CTI application executing section 11f of CTIMonitorStartConfEvent (defined by Versit TSAPI), which indicates successful start of monitoring, via the LAN.

When a call comes in the central office trunk 15 thereafter, the incoming information and originating number relating to the incoming call are notified to the exchange 12. For example, in the case where a user makes a PPP dial-up from the user device 14 to access the WWW server 11, the exchange 12 determines which line concentrator is to be used as a destination of the incoming call, in accordance with the incoming information. It is here assumed that the line concentrator 16a with the line number 2000 is determined as the destination of the incoming call. The exchange 12 also receives the originating number 044-777-1111 from the central office trunk 15.

[S5] The exchange 12 notifies the CTI application executing section 11f of CTIOriginatedvent (defined by Versit TSAPI), which indicates that the destination of the call has been decided, via the LAN. This notification is accompanied by the originating number 044-777-1111 and the destination line number 2000 as additional information.

On receiving the CTIOriginatedEvent, the CTI application executing section 11f writes the additional information, that is, the originating number and the destination line number, in the user access logging table of the database 11e (data No. 1 in FIG. 4).

[S6] If the line concentrator 16a with the line number 2000, for example, is free and thus can accept the incoming call, the exchange 12 sends an incoming acceptance request to the WWW server 11 prior to the process of Step S6. If the WWW server 11 responds to the request, the exchange 12 establishes the connection between the central office trunk 15 and the line concentrator 16a with the line number 2000. Then, the exchange 12 notifies the CTI application executing section 11f of CTIEstablishedEvent (defined by Versit TSAPI), which indicates that the terminating-side WWW server 11 has responded, via the LAN.

On receiving the CTIEstablishedEvent, the CTI application executing section 11f writes the already notified additional information, that is, the originating number and the destination line number, as well as the current date and time in the user access logging table of the database 11e (data No. 2 in FIG. 4). In this case, the current date and time are written as a connection start time.

If, after the process of Step S6, the user device 14 requests an access specifying a certain home page, the WWW server 11 sends the specified home page to the user device 14 via the transmitting port 11g, the line concentrator 16a, the exchange 12, the central office trunk 15 and the public network 13. At this time, the CTI application executing section 11f converts the port number 1 of the transmitting port 11g, which is transmitting the specified home page, to the line number 2000 by referring to the port number-to-line number conversion table 11d. The CTI application executing section 11f then writes the line number 2000, the filename of the specified home page (in this example, Fujitsu.html), and the current date and time in the user access logging table of the database 11e (data No. 3 in FIG. 4). In this case, the current date and time are written as a home page access start time. Further, specification information sent from the user, that is, information indicative of whether the user desires to purchase the goods or services whose advertisement is posted on this home page and whether the user requires a call-back from the trader, is also written.

If the user device 14 thereafter requests an access specifying another home page, the WWW server 11 sends the newly specified home page to the user device 14. Also in this case, the CTI application executing section 11f converts the port number 1 of the transmitting port 11g, which is transmitting the specified home page, to the line number 2000, and then writes this line number 2000, the filename of the specified home page (in this example, FMV.html), and the current date and time in the user access logging table of the database 11e (data No. 4 in FIG. 4). The current date and time are in this case written as a home page access start time.

[S7] If it is not possible to establish a connection between the central office trunk 15 and the line concentrator 16a with the line number 2000 because the line concentrator 16a is in use, for example, or if after the connection between the user device 14 and the WWW server 11 is established, the user device 14 terminates the connection, the exchange 12 notifies the CTI application executing section 11f via the LAN that the connection with the terminating-side WWW server 11 is not possible, or of CTIConnectionClearedEvent (defined by Versit TSAPI) which indicates that the connection has been terminated. When the connection between the user device 14 and the WWW server 11 is terminated, the exchange 12 performs a process for releasing the connection between the central office trunk 15 and the line concentrator 16a.

On receiving the CTIConnectionClearedEvent, the CTI application executing section 11f writes the already notified additional information, that is, the originating number and the destination line number, as well as the current date and time in the user access logging table of the database 11e (data No. 5 in FIG. 4). In this case, the current date and time are written as a connection end time.

In this manner, historical data indicative of users' access to home pages is cumulatively recorded in the user access logging table of the database 11e.

[S8] The CTI application executing section 11f periodically monitors the user access logging table of the database 11e and extracts all of data with an identical line number in order of recordation. Then, from the data thus extracted, a series of data from a data item which immediately follows an item indicating a connection end time up to a data item indicating the next connection end time is extracted. The series of data extracted in this manner constitutes an access history corresponding to one session of access to the WWW server 11 by an identical user.

If the information "purchase desired" is included in the access history, the home page name in the data in which this information is included and the originating number in the access history are extracted. In the example shown in FIG. 4, the home age name FMV.html and the originating number 044-777-1111 are extracted. Then, referring to the operator information (FIG. 5) in the database 11e, the CTI application executing section 11f locates the operator's telephone number 5000 associated with the home page name FMV.html. The operator's telephone number 5000 is the telephone number of an operator who acts for the trader having an advertisement posted on the home page with the home page name FMV.html.

Subsequently, the CTI application executing section 11f sends ctiMakeCall (defined by Versit TSAPI), which is a two-party connection request, to the exchange 12 via the LAN. This request is accompanied by the originating number 044-777-1111 and the operator's telephone number 5000 as additional information.

[S9] On receiving the ctiMakeCall, the exchange 12 sends CTIMakeCallConfEvent (defined by Versit TSAPI), which is a notification of the reception of a two-party connection request, to the CTI application executing section 11f via the LAN. The exchange 12 then establishes a connection between the user's telephone 23 specified by the originating number 044-777-1111 and the telephone 21 specified by the operator's telephone number 5000 via the central office trunk 18 and the LC device 20. The user's telephone 23 and the user device 14 operate on the same telephone number.

In the case where the operator is equipped with the personal computer 22 which is assigned the IP address 111.222.333.445 as shown in FIGS. 2 and 5, the CTI application executing section 11f sends the home page with the home page name FMV.html to the personal computer 22 via the LAN so that the home page pops up on the screen of the personal computer 22 through a WWW browser. This makes it easy for the operator to have a conversation or make arrangements with the user.

In the example described above, the user's telephone 23 and the operator's telephone 21 with the telephone number 5000 are connected when the access history includes the information "purchase desired." The user's telephone and the operator's telephone may be connected also when the access history includes the information "call-back required."

As described above, the WWW server 11 can be informed of users' telephone numbers, without the need to have users enter their telephone number on home pages, whereby two-party connection can be achieved.

Further, according to the first embodiment, since the WWW server 11 incorporates therein the CTI application executing section 11f, the database 11e, etc., the real-time performance of the exchange 12 is not spoiled and thus the on-line shopping system can provide a real-time service.

A second embodiment will be now described.

The second embodiment is basically identical in configuration with the first embodiment, and therefore, in the following description of the second embodiment, reference should also be made to the explanation of the configuration of the first embodiment. The second embodiment differs from the first embodiment in the manner of using the access history extracted in Step S8 of FIG. 6 in the first embodiment.

FIGS. 7(A) to 7(C) are diagrams illustrating a method of using the access history according to the second embodiment. The access history is a history having a coverage from the time at which one user started accessing the WWW server 11 via a specific line concentrator to the time at which the same user terminated the access. Thus, based on the access history, the CTI application executing section 11f calculates a time period for which this user accessed the WWW server 11 via the specific line concentrator. Also, time periods for which other users accessed the WWW server 11 via the specific line concentrator are calculated. FIG. 7(A) shows, by way of example, part of such calculation results. The illustrated example indicates that the user with the originating number 044-777-1111 and a user with the originating number 044-777-1112 accessed for respective certain periods of time. The access time (period) corresponding to one session of access, obtained in this manner, is accumulated. FIG. 7(B) shows an example of such calculation results.

On the other hand, a reference access time (period) is set, as shown in FIG. 7(C). The CTI application executing section 11f then compares each cumulative access time with the reference access time, to detect cumulative access times longer than the reference access time. Subsequently, the originating numbers associated with the detected cumulative access times are extracted.

The CTI application executing section 11f notifies the exchange 12 of each of the thus-extracted originating numbers and the telephone number of the operator acting for a trader who is providing home pages via the aforementioned specific line concentrator, and makes a two-party connection request. When the two parties are connected with each other, the operator may have a talk directly with the user, or appropriate information may be transmitted to the user via a voice guidance apparatus or a facsimile machine.

Therefore, according to the second embodiment, the operator can make contact with users who have great interest in a plurality of home pages provided by the same trader, thus improving the efficiency in persuading users to purchase goods or services, etc.

A third embodiment will be now described.

The third embodiment is basically identical in configuration with the first embodiment, and therefore, in the following description of the third embodiment, reference should also be made to the explanation of the configuration of the first embodiment. The third embodiment differs from the first embodiment in the manner of using the access history extracted in Step S8 of FIG. 6 in the first embodiment.

FIGS. 8(A) and 8(B) are diagrams illustrating a method of using the access history according to the third embodiment. As mentioned above, the access history is a history having a coverage from the time at which one user started accessing the WWW server 11 via a specific line concentrator to the time at which the same user terminated the access. Thus, the CTI application executing section 11f collects a large number of access histories and calculates the number of times (frequency) each user accessed the WWW server 11 via the specific line concentrator. FIG. 8(A) shows, by way of example, such calculation results. The illustrated example indicates that access was made by the user with the originating number 044-777-1111 and by the user with the originating number 044-777-1112.

On the other hand, a reference access frequency is set as shown in FIG. 8(B). The CTI application executing section 11f then compares each user's access frequency with the reference access frequency, to detect user access frequencies greater than the reference access frequency. Subsequently, the CTI application executing section 11f extracts the originating numbers associated with the detected access frequencies.

The CTI application executing section 11f then notifies the exchange 12 of each of the thus-extracted originating numbers and the telephone number of the operator acting for a trader who is providing home pages via the aforementioned specific line concentrator, and makes a two-party connection request.

Accordingly, also in the third embodiment, the operator can make contact with users who have great interest in a plurality of home pages provided by the same trader, thus improving the efficiency in persuading users to purchase goods or services, etc.

A fourth embodiment will be now described.

The fourth embodiment is basically identical in configuration with the first embodiment, and therefore, in the following description of the fourth embodiment, reference should also be made to the explanation of the configuration of the first embodiment. The fourth embodiment differs from the first embodiment in the manner of using the access history extracted in Step S8 of FIG. 6 in the first embodiment.

FIGS. 9(A) to 9(C) are diagrams illustrating a method of using the access history according to the fourth embodiment. As mentioned above, the access history is a history having a coverage from the time at which one user started accessing the WWW server 11 via a specific line concentrator to the time at which the same user terminated the access. Thus, based on the access history, the CTI application executing section 11f calculates a time period for which this user accessed the WWW server 11 via the specific line concentrator. Also, time periods for which other users accessed the WWW server 11 via the specific line concentrator are calculated. FIG. 9(A) shows, by way of example, part of such calculation results. The illustrated example indicates that the user with the originating number 044-777-1111 and the user with the originating number 044-777-1112 made access on the day indicated in the column "date of access." The access time (period) corresponding to one session of access, obtained in this manner, is accumulated for a predetermined term past (e.g., for the past one month). FIG. 9(B) shows an example of such calculation results.

On the other hand, a reference access time (period) is set, as shown in FIG. 9(C). The CTI application executing section 11f then compares each cumulative access time with the reference access time to detect cumulative access times longer than the reference access time, and extracts the originating numbers associated with the detected cumulative access times.

Subsequently, the CTI application executing section 11f notifies the exchange 12 of each of the thus-extracted originating numbers and the telephone number of the operator acting for a trader who is providing home pages via the aforementioned specific line concentrator, and makes a two-party connection request.

Therefore, also in the fourth embodiment, the operator can make contact with users who have great interest in a plurality of home pages provided by the same trader, thus improving the efficiency in persuading users to purchase goods or services, etc.

A fifth embodiment will be now described.

The fifth embodiment is basically identical in configuration with the first embodiment, and therefore, in the following description of the fifth embodiment, reference should also be made to the explanation of the configuration of the first embodiment. The fifth embodiment differs from the first embodiment in the manner of using the access history extracted in Step S8 of FIG. 6 in the first embodiment.

FIGS. 10(A) and 10(B) are diagrams illustrating a method of using the access history according to the fifth embodiment. As mentioned above, the access history is a history having a coverage from the time at which one user started accessing the WWW server 11 via a specific line concentrator to the time at which the same user terminated the access. Thus, the CTI application executing section 11f collects such access histories falling within a predetermined term past (e.g., past one month), and calculates the number of times (frequency) each user accessed the WWW server 11 via the specific line concentrator. FIG. 10(A) shows, by way of example, such calculation results. The illustrated example indicates that access was made by the user with the originating number 044-777-1111 and by the user with the originating number 044-777-1112.

On the other hand, a reference access frequency is set as shown in FIG. 10(B). The CTI application executing section 11f then compares each user's access frequency with the reference access frequency, to detect user access frequencies greater than the reference access frequency. Subsequently, the originating numbers associated with the detected access frequencies are extracted.

The CTI application executing section 11f notifies the exchange 12 of each of the thus-extracted originating numbers and the telephone number of the operator acting for a trader who is providing home pages via the aforementioned specific line concentrator, and makes a two-party connection request.

Accordingly, also in the fifth embodiment, the operator can make contact with users who have great interest in a plurality of home pages provided by the same trader, thus improving the efficiency in persuading users to purchase goods or services, etc.

The fifth embodiment may be combined with the fourth embodiment so that the two-party connection may be established taking account of both the access time and the access frequency.

A sixth embodiment will be now described.

The sixth embodiment is basically identical in configuration with the first embodiment, and therefore, in the following description of the sixth embodiment, reference should also be made to the explanation of the configuration of the first embodiment. The sixth embodiment differs from the first embodiment in the manner of using the access history extracted in Step S8 of FIG. 6 in the first embodiment.

FIGS. 11(A) and 11(B) are diagrams illustrating a method of using the access history according to the sixth embodiment. As mentioned above, the access history is a history having a coverage from the time at which one user started accessing the WWW server 11 via a specific line concentrator to the time at which the same user terminated the access. Thus, based on the access history, the CTI application executing section 11f calculates a time period for which this user accessed a certain home page. Also, time periods for which this user accessed other home pages are calculated. FIG. 11(A) shows, by way of example, part of such calculation results. The illustrated example indicates that the user with the originating number 044-777-1111 accessed the home page with the home page name Fujitsu.html and the home page with the home page name FMV.html on the day indicated in the column "date of access." The access times (periods) of individual home pages corresponding to one session of access, obtained in this manner, are accumulated for a predetermined term past (e.g., for the past one month) in respect of each user. FIG. 11(B) shows an example of such calculation results.

The CTI application executing section 11f then compares each cumulative access time with a reference access time to detect cumulative access times longer than the reference access time, and extracts the originating numbers and home pages associated with the detected cumulative access times.

Referring to the operator information shown in FIG. 5, the CTI application executing section 11f detects the telephone number of the operator acting for the trader who has an advertisement posted on the extracted home page, notifies the exchange 12 of the operator's telephone number and the extracted originating number, and makes a two-party connection request.

According to the sixth embodiment, therefore, the operator can make contact with users who have great interest in specific home pages, thus improving the efficiency in persuading users to purchase goods or services, etc. and allowing the operator to contact groups of users with specific interests.

A seventh embodiment will be now described.

The seventh embodiment is basically identical in configuration with the first embodiment, and therefore, in the following description of the seventh embodiment, reference should also be made to the explanation of the configuration of the first embodiment. The seventh embodiment differs from the first embodiment in the manner of using the access history extracted in Step S8 of FIG. 6 in the first embodiment.

FIG. 12 is a diagram illustrating a method of using the access history according to the seventh embodiment. As mentioned above, the access history is a history having a coverage from the time at which one user started accessing the WWW server 11 via a specific line concentrator to the time at which the same user terminated the access. The CTI application executing section 11f collects such access histories falling within a predetermined term past (e.g., past one month), and calculates the number of times (frequency) each user accessed each of the home pages. FIG. 12 shows an example of such calculation results. The illustrated example indicates the number of times the user with the originating number 044-777-1111 accessed the home page with the home page name Fujitsu.html and the number of times the same user accessed the home page with the home page name FMV.html.

The CTI application executing section 11f then compares each access frequency with a reference access frequency to detect access frequencies greater than the reference access frequency, and extracts the originating numbers and home pages associated with the detected access frequencies.

Referring to the operator information shown in FIG. 5, the CTI application executing section 11f detects the telephone number of the operator acting for the trader who has an advertisement posted on the extracted home page, notifies the exchange 12 of the operator's telephone number and the extracted originating number, and makes a two-party connection request.

Accordingly, also in the seventh embodiment, the operator can make contact with users who have great interest in specific home pages, thus improving the efficiency in persuading users to purchase goods or services, etc. and allowing the operator to contact groups of users with specific interests.

The seventh embodiment may be combined with the sixth embodiment so that the two-party connection may be established taking account of both the access time and the access frequency.

An eighth embodiment will be now described.

The eighth embodiment is basically identical in configuration with the second embodiment, and therefore, in the following description of the eighth embodiment, reference should also be made to the explanation of the configuration of the second embodiment.

In the eighth embodiment, the database 11e holds customer information. FIG. 13 shows an example of the customer information, in which are recorded users' telephone numbers, delinquency/non-delinquency in payment, sum totals of the past purchase, etc.

After a user's telephone number, which specifies one of the two parties to be connected, is extracted as in the second embodiment, the CTI application executing section 11f refers to the customer information in the database 11e. If the extracted telephone number coincides with one included in the customer information, the CTI application executing section 11f sends a two-party connection request to the exchange 12.

Alternatively, a two-party connection request may be sent from the CTI application executing section 11f to the exchange 12 when the extracted telephone number coincides with one included in the customer information and at the same time the customer specified by the telephone number has never been delinquent in payment. Also, the customer information may further be checked to ascertain that the sum total of past purchase is greater than or equal to a predetermined amount, before a two-party connection request is sent from the CTI application executing section 11f to the exchange 12.

Consequently, the operator can make contact with users efficiently and securely to persuade them to purchase goods or services.

The eighth embodiment based on the second embodiment uses the customer information, but any of the third through seventh embodiments may be modified to hold similar customer information so that the two-party connection may be requested after reference is made to the customer information.

A ninth embodiment will be now described.

The ninth embodiment is basically identical in configuration with the first embodiment, and therefore, in the following description of the ninth embodiment, reference should also be made to the explanation of the configuration of the first embodiment. The ninth embodiment differs from the first embodiment in the manner of using the access history extracted in Step S8 of FIG. 6 in the first embodiment.

FIG. 14 is a diagram illustrating a method of using the access history according to the ninth embodiment. As mentioned above, the access history is a history having a coverage from the time at which one user started accessing the WWW server 11 via a specific line concentrator to the time at which the same user terminated the access. The CTI application executing section 11f checks the individual access histories and extracts those access histories which have no connection start time recorded therein and include only the connection end time. Each of the access histories extracted in this manner indicates the case wherein a user accessed the WWW server 11 via the specific line concentrator but could not view any home pages because of line busy condition.

Based on these access histories, the CTI application executing section 11f creates a list of users who failed to access. FIG. 14 shows an example of such a failed-to-access users list, in which are recorded the originating number and the day and time of access. The day and time of access in the list are fetched from the day of the week and the time, respectively, in the column "connection end time" of the access history.

At the same time of the same day of the week as recorded in the failed-to-access users list, or at the same time as recorded in the failed-to-access users list without regard to the day of the week, the CTI application executing section 11f notifies the exchange 12 of the originating number associated with the day and time of access in question and the telephone number of the operator acting for a trader who is providing home pages via the aforementioned specific line concentrator, and makes a two-party connection request.

Preferably, this two-party connection request should be made in cases where although a two-party connection request was made before, it was not responded to or the line was busy.

Thus, in the ninth embodiment, the two-party connection is attempted during a selected period of time in which the possibility of the user responding is high, whereby the operator is prevented from wasting time and labor.

The ninth embodiment may be combined with any one of the first through eighth embodiments.

A tenth embodiment will be now described.

The tenth embodiment is basically identical in configuration with the first embodiment, and therefore, in the following description of the tenth embodiment, reference should also be made to the explanation of the configuration of the first embodiment. The tenth embodiment differs from the first embodiment in the manner of using the access history extracted in Step S8 of FIG. 6 in the first embodiment.

FIG. 15 is a diagram illustrating a method of using the access history according to the tenth embodiment. As mentioned above, the access history is a history having a coverage from the time at which one user started accessing the WWW server 11 via a specific line concentrator to the time at which the same user terminated the access. The CTI application executing section 11f checks the individual access histories and extracts those access histories which have no connection start time recorded therein and include only the connection end time. Each of the access histories extracted in this manner indicates the case wherein a user accessed the WWW server 11 via the specific line concentrator but could not view any home pages because of line busy condition.

Based on these access histories, the CTI application executing section 11f creates a list of users who failed to access. FIG. 15 shows an example of such a failed-to-access users list.

The CTI application executing section 11f monitors messages received from the exchange 12, and waits to be notified of CTIConnectionClearedEvent which indicates that the connection between a user and the WWW server has been terminated. On receiving the CTIConnectionClearedEvent, the CTI application executing section 11f judges that a line is free, and reads an originating number recorded in the failed-to-access users list. Then, the CTI application executing section 11f notifies the exchange 12 of the thus-read originating number and the telephone number of the operator acting for a trader who is providing home pages via the aforementioned specific line concentrator, and makes a two-party connection request. Alternatively, the CTI application executing section 11f notifies the exchange 12 of the read originating number and the telephone number of a voice guidance apparatus and requests a two-party connection. In this case, the voice guidance apparatus may send the user prerecorded speech data informing the user of a time zone in which the traffic level is low, thereby encouraging the user to access again.

As described above, according to the present invention, a WWW server and an exchange are connected in one-to-one correspondence. The exchange finally receives a PPP dial-up from a user device and thus can be informed of the originating number of the user device. The WWW server stores first information about the connection of the user device to the WWW server in storage means after converting a transmitting port number accompanying the first information to a corresponding line number. Also, second information (originating number) about the connection of the user device, obtained at the exchange, is stored in the storage means together with the line number. In the storage means, the first information and the second information are combined through the agency of the line number.

Accordingly, the WWW server can be informed of users' telephone numbers without the need to have users enter their telephone number on home pages. After the access to a home page is terminated, therefore, it is possible to automatically establish a connection between the telephone of a trader providing the home page and the telephone of the user who accessed the home page.

Further, by using the first information and second information stored in the storage means, novel two-party connection services can be provided.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An on-line shopping system enabling users to do shopping by referring to on-line advertisements posted on home pages provided by WWW (World Wide Web) servers on Internet, comprising:

a WWW server having a plurality of transmitting ports and providing at least one home page via each of the transmitting ports;

an exchange connected in one-to-one correspondence to said WWW server and finally receiving a PPP (Point-to-Point Protocol) dial-up from a user device;

a conversion table for converting numbers assigned to the respective transmitting ports of said WWW server to corresponding line numbers of line concentrators of said exchange connected to the respective transmitting ports;

number converting means for converting a transmitting port number, which accompanies first information about connection of the user device to said WWW server, to a corresponding line number by referring to said conversion table;

storage means for storing the first information accompanied by the line number obtained by said number converting means, and for storing second information about connection of the user device, obtained at said exchange, together with a line number accompanying the second information;

a correlation table for correlating names of home pages provided by said WWW server with telephone numbers of traders having on-line advertisements posted on the home pages;

sorting means for extracting information accompanied by identical line numbers from among the first information and the second information stored in said storage means, and sorting out a specific user device and a specific home page from the extracted information;

reading means for reading, based on the specific home page sorted out by said sorting means, the telephone number of a corresponding trader by referring to said correlation table; and connection control means for causing said exchange to establish a connection between the trader and the user device based on the telephone number of the trader read by said reading means and the second information stored in said storage means.

2. The on-line shopping system according to claim 1, wherein the first information includes date and time at which connection of the user device to said WWW server was established, date and time at which the connection was terminated, and dates and times at which the user device accessed individual home pages provided by said WWW server.

3. The on-line shopping system according to claim 1, wherein the second information includes a telephone number of the user device.

4. The on-line shopping system according to claim 1, further comprising affixing means for attaching predetermined information from the user device to the first information stored in said storage means, said sorting means sorting out the specific user device and home page by referring to the predetermined information attached to the first information.

5. The on-line shopping system according to claim 4, wherein the predetermined information is information indicative of desire to purchase advertised goods or services.

6. The on-line shopping system according to claim 4, wherein the predetermined information is information indicating that a user desires a telephone call-back from a trader having an on-line advertisement posted on the home pages.

7. The on-line shopping system according to claim 1, wherein said sorting means includes:

totaling means for totaling, in respect of each home page and each user device, access times for which the individual user devices accessed the individual home pages provided by said WWW server, based on the extracted information; and detecting means for extracting an access time longer than a predetermined time period from among the access times totaled by said totaling means, detecting a user device and a home page associated with the extracted access time, and using the detected user device and home page as the specific user device and home page.

8. The on-line shopping system according to claim 7, wherein said totaling means totals the access times falling within a predetermined term.

9. The on-line shopping system according to claim 1, wherein said sorting means includes:

totaling means for totaling, in respect of each home page and each user device, access frequencies with which the individual user devices accessed the individual home pages provided by said WWW server, based on the extracted information; and detecting means for extracting an access frequency greater than a predetermined frequency from among the access frequencies totaled by said totaling means, detecting a user device and a home page associated with the extracted access frequency, and using the detected user device and home page as the specific user device and home page.

10. The on-line shopping system according to claim 9, wherein said totaling means totals the access frequencies falling within a predetermined term.

11. The on-line shopping system according to claim 1, further comprising customer information, said sorting means sorting out the specific user device and home page from the extracted information by referring to the customer information.

12. The on-line shopping system according to claim 1, further comprising:

day/time extracting means for extracting a day and time at which the user device was connected to said WWW server, from the first information in cases where said connection control means caused said exchange to establish a connection between the trader and the user device but the connection failed; and reconnection control means for causing said exchange to again establish a connection between the trader and the user device at a time of a day determined based on the day and time extracted by said day/time extracting means.

13. The on-line shopping system according to claim 1, wherein said conversion table, said number converting means, said storage means, said correlation table, said sorting means, said reading means and said connection control means are incorporated in said WWW server.

14. An on-line shopping system enabling users to do shopping by referring to on-line advertisements posted on home pages provided by WWW (World Wide Web) servers on Internet, comprising:

a WWW server having a plurality of transmitting ports and providing at least one home page via each of the transmitting ports;

an exchange connected in one-to-one correspondence to said WWW server and finally receiving a PPP (Point-to-Point Protocol) dial-up from a user device;

a conversion table for converting numbers assigned to the respective transmitting ports of said WWW server to corresponding line numbers of line concentrators of said exchange connected to the respective transmitting ports;

number converting means for converting a transmitting port number, which accompanies first information about connection of the user device to said WWW server, to a corresponding line number by referring to said conversion table;

storage means for storing the first information accompanied by the line number obtained by said number converting means, and for storing second information about connection of the user device, obtained at said exchange, together with a line number accompanying the second information;

a correlation table for correlating names of traders having on-line advertisements posted on home pages provided by said WWW server, with telephone numbers of the traders;

sorting means for extracting information accompanied by identical line numbers from among the first information and the second information stored in said storage means, and sorting out a specific user device and a specific trader from the extracted information;

reading means for reading, based on the name of the specific trader sorted out by said sorting means, the telephone number of the trader by referring to said correlation table; and connection control means for causing said exchange to establish a connection between the trader and the user device based on the telephone number of the trader read by said reading means and the second information stored in said storage means.

15. The on-line shopping system according to claim 14, wherein said sorting means includes:

totaling means for totaling, in respect of each user device, access times for which the individual user devices accessed the home pages provided by the traders, based on the extracted information; and identifying means for extracting an access time longer than a predetermined time period from among the access times totaled by said totaling means, and identifying a user device and a trader associated with the extracted access time, said reading means reading, based on the trader identified by said identifying means, the telephone number of the trader by referring to said correlation table.

16. The on-line shopping system according to claim 15, wherein said totaling means totals the access times falling within a predetermined term.

17. The on-line shopping system according to claim 14, wherein said sorting means includes:

totaling means for totaling, in respect of each user device, access frequencies with which the individual user devices accessed the home pages provided by the traders, based on the extracted information; and identifying means for extracting an access frequency greater than a predetermined frequency from among the access frequencies totaled by said totaling means, and identifying a user device and a trader associated with the extracted access frequency, said reading means reading, based on the trader identified by said identifying means, the telephone number of the trader by referring to said correlation table.

18. The on-line shopping system according to claim 17, wherein said totaling means totals the access frequencies falling within a predetermined term.

* * * * *